United States Patent Office 3,458,400
Patented July 29, 1969

3,458,400
PROCESS FOR PRODUCING L-ALANINE
Ichiro Chibata, Toyonaka-shi, and Toshio Kakimoto and Joji Kato, Sakai-shi, Japan, assignors to Tanabe Seiyaku Co., Ltd., Higashi-ku, Osaka, Japan, a corporation of Japan
No Drawing. Filed Nov. 22, 1965, Ser. No. 509,206
Claims priority, application Japan, Nov. 24, 1964, 39/66,318
Int. Cl. C12d 1/02; C07c 99/00, 101/08
U.S. Cl. 195—29         4 Claims

ABSTRACT OF THE DISCLOSURE

A process for producing L-alanine which comprises fermenting a microorganism of Pseudomonas dacunhae or Achromobacter pestifer in an aqueous nutrient medium containing a dibasic organic carboxylic acid or its salt as a main carbon source and other suitable nutrients, incubating L-aspartic acid with the resulting fermentative broth or its refined aqueous preparation, and recovering L-alanine from the reaction mixture.

---

This invention relates to a process for producing L-alanine by enzymic decarboxylation of L-aspartic acid.

As an amino acid of commercial importance, L-alanine is well known in the pharmaceutical field and in the food industry as the starting material of numerous chemical compounds. This amino acid may be supplied by fermenting L-alanine producing microorganism; however, this method was not economical for commercial production.

L-aspartic-$\beta$-decarboxylase has a catalytic action to decarboxylate L-aspartic acid on its $\beta$-position thereby yielding L-alanine, and certain species of the genus Pseudomonas and genus Achromobacter produce such decarboxylase. However, the decarboxylase activity produced by the former bacteria was so poor that its maximum activity did not exceed 60 in $Q_{co_2}$ at 35° C. ($Qco_2=CO_2$ $\mu$l. generated/hour/mg. of protein). Furthermore, the reported bacteria of genus Pseudomonas, namely, Pseudomonas reptilivora produces another enzyme at the same time by which L-alanine is decarboxylated. The latter bacteria, Achromobacter d–15, was not practical for industrial production of L-alanine due to its poor growth characteristics.

When Pseudomonas dacunhae or Achromobacter pestifer was fermented in the presence of an organic acid, markedly higher activity of L-aspartic-$\beta$-decarboxylase is accumulated in its cell. For example, L-aspartic-$\beta$-decarboxylase activity obtained from the fermentative broth of Pseudomonas dacunhae is 1824 $Q_{co_2}$ at 30° C. and that of Acromobacter pestifer is 1023 $Q_{co_2}$. Moreover, they do not produce any other interfering enzymes which result in decomposition or racemization of L-alanine.

According to this invention, L-alanine is produced in high yield by fermenting Pseudomonas dacunhae or Achromobacter pestifer in an aqueous nutrient medium containing an organic acid as a main carbon source and other suitable nutrients and reacting the resulting fermentative broth with L-asparatic acid.

A medium which we have found to be suitable for use in this invention is one containing about 0.5 to 2% of dibasic organic carboxylic acid such as fumaric acid, succinic acid, malic acid or their salts as sole or main carbon source. As nitrogen source inorganic ammonium salt, such as the chloride, phosphate or sulfate, may be added. But the ammonium salt of above organic acid gives better result as nitrogen source. Besides these nutrients, 1 to 3% of an organic nitrogen source such as corn steep liquor, peptone, yeast extract, meat extract, case in hydrolysate or urea and a small amount of mineral salts, such as potassium phosphate, magnesium sulfate, may be added to the medium.

Formation of L-aspartic-$\beta$-decarboxylase reaches maximum when the bacterial growth reaches in a stage between the end of logarithmic phase and the initial stage of stationary phase. Maximum formation of the enzyme may be accomplished by carrying out the fermentation at a temperature of 25 to 30° C., preferably at 30° C. for one day under aerobic condition.

After the fermenation, L-aspartic acid is added to the fermentative broth and the mixture is incubated for a sufficient length of time to convert L-aspartic acid into L-alanine.

L-aspartic acid can be added to the fermentative broth in excess of 70%. As the solubility of L-aspartic acid in water is less than 1%, most of L-aspartic acid remains in suspended form in the broth at the initial stage and dissolves slowly as the reaction proceeds. Thus, the reaction mixture is conveniently maintained at the most suitable pH for enzymic conversion by a buffer action due to the gradual solution of L-aspartic acid.

Usually, the decarboxylation may be substantially completed after incubation at a temperature of 30 to 40° C., preferably at 37° C. for two to four days. In the above decarboxylating procedures, the fermentative broth may be replaced by an aqueous suspension of living cells collected from the broth by filtration or by dried cells. A cell-free extract containing L-asparatic-$\beta$-decarboxylase prepared by ordinary procedures, such as extraction after sonic treatment or grinding with quartz sand of the living cells, can also be employed.

The reaction time of enzymic decarboxylation can be shortened to approximately one-third when about 0.005 to 2% of a surface active agent such as fatty acid esters of polyoxyethylene or polyoxyethylene sorbitan is added to the reaction mixture.

L-alanine produced in the reaction mixture is then purified by filtering the mixture, treating the filtrate with a strong cation exchange resin (such as the sulfonic acid resin, Dowex–50 or Amberlite IR–120), and concentrating the treated solution. Thus, over 43 g. of pure L-alanine crystals are obtainable from 100 ml. of the reaction mixture, and such high yield had never been realized with the prior art.

Example 1

120 ml. of an aqueous nutrient medium containing the following ingredients was prepared:

| | Percent |
|---|---|
| Ammonium fumarate | 0.5 |
| Sodium fumarate | 1.0 |
| Corn steep liquor | 2.2 |
| $KH_2PO_4$ | 0.05 |
| $MgSO_4 \cdot 7H_2O$ | 0.01 |

The above medium was adjusted to pH 7.0 and charged in a shaking flask of 500 ml. volume. After sterilization, a strain of Pseudomonas dacunhae was introduced into the medium and the medium was incubated for 26 hours with reciprocal shaking of 140 c.p.m. at 30° C. To the fermentative broth 48 g. of L-aspartic acid was added and the mixture was incubated at 37° C., and 100% conversion to L-alanine was attained for 96 hours. After adjusting to pH 4.0, the incubated mixture was boiled and filtered. The resulting filtrate was passed through a column of sulfonic acid type cation exchange resin (Amerblite IR–120). After elution with aqueous ammonia, the eluate was concentrated to give 29.2 g. of L-alanine crystals.

$$[\alpha]_D^{25} = +14.3° \ (c.=4, \text{ in } 6 \text{ N HCl})$$

Example 2

A strain of *Achromobacter pestifer* was fermented at the same condition as Example 1. To the fermentative broth, 36 g. of L-aspartic acid was added and the mixture was incubated for 96 hours at 37° C. The incubated mixture was treated as described in Example 1 whereby 21.2 g. of L-alanine crystals were obtained.

$[\alpha]_D^{25} = +14.3°$ (c.=4, in 6 N HCl)

Example 3

A strain of *Pseudomonas dacunhae* was introduced into 120 ml. of aqueous nutrient medium (pH 7.0) containing the following ingredients:

| | Percent |
|---|---|
| Ammonium fumarate | 0.5 |
| Sodium fumarate | 1.0 |
| Corn steep liquor | 0.55 |
| Peptone | 1.8 |
| $KH_2PO_4$ | 0.05 |
| $MgSO_4 \cdot 7H_2O$ | 0.01 | and incubated for 26 hours at 30° C. with shaking of 140 c.p.m. To the fermentative broth 48 g. of L-aspartic acid was added and the mixture was incubated for 72 hours at 37° C. The incubated mixture was treated as described in Example 1 whereby 29.5 g. of L-alanine crystals were obtained.

$[\alpha]_D^{25} = +14.2°$ (c.=4, in 6 N HCl)

Example 4

A strain of *Achromobacter pestifer* was fermented under the same conditions as Example 3. To the fermentative broth 36 g. of L-aspartic acid was added and the mixture was incubated for 72 hours at 37° C. The incubated mixture was treated as described in Example 1, whereby 21.7 g. of L-alanine crystals were obtained.

$[\alpha]_D^{25} = +14.2°$ (c.=4, in 6 N HCl)

Example 5

A strain of *Pseudomonas dacunhae* was fermented under the same conditions as Example 3. To the fermentative broth 0.1% of polyoxyethylene sorbitan monolaurate and 48 g. of L-aspartic acid were added and the mixture was incubated for 24 hours at 37° C. The incubated mixture was treated as described in Example 1, whereby 29.1 g. of L-alanine crystals were obtained.

$[\alpha]_D^{25} = +14.2°$ (c.=4, in 6 N HCl)

Example 6

A strain of *Achromobacter pestifer* was fermented under the same conditions as Example 3. To the fermentative broth 0.1% of polyoxyethylene stearate and 36 g. of L-aspartic acid were added and incubated for 24 hours at 37° C. The incubated mixture was treated as described in Example 1 whereby 21.4 g. of L-alanine crystals were obtained.

$[\alpha]_D^{25} = +14.2°$ (c.=4, in 6 N HCl)

Example 7

A strain of *Pseudomonas dacunhae* was introduced into 120 ml. of aqueous nutrient medium (pH 5.5) containing the following ingredients:

| | Percent |
|---|---|
| Ammonium fumarate | 0.5 |
| Sodium fumarate | 1.0 |
| Casein hydrolysate | 0.2 |
| Peptone | 0.9 |
| $KH_2PO_4$ | 0.05 |
| $MgSO_4 \cdot 7H_2O$ | 0.01 | and incubated for 20 hours at 30° C. with shaking of 140 c.p.m. To the fermentative broth 84 g. of L-aspartic acid was added and the mixture was incubated for 72 hours at 37° C. The incubated mixture was treated as described in Example 1 whereby 51.2 g. of L-alanine crystals were obtained.

$[\alpha]_D^{25} = +14.2°$ (c.=4, in 6 N HCl)

Example 8

A strain of *Achromobacter pestifer* was fermented under the same conditions as Example 7. To the fermentative broth 48 g. of L-aspartic acid was added and the mixture was incubated for 72 hours at 37° C. The incubated mixture was treated as described in Example 1 whereby 29.5 g. of L-alanine crystals were obtained.

$[\alpha]_D^{25} = +14.3°$ (c.=4, in 6 N HCl)

Example 9

A strain of *Pseudomonas dacunhae* was fermented under the same conditions as Example 7. To the fermentative broth 0.1% of polyoxyethylene sorbitan monolaurate and 84 g. of L-aspartic acid were added and the mixture was incubated for 24 hours at 37° C. The incubated mixture was treated as described in Example 1 whereby 51.5 g. of L-alanine crystals were obtained.

$[\alpha]_D^{25} = +14.2°$ (c.=4, in 6 N HCl)

Example 10

A strain of *Achromobacter pestifer* was fermented under the same conditions as Example 7. To the fermentative broth 0.1% of polyoxyethylene sorbitan monolaurate and 48 g. of L-aspartic acid were added and the mixture was incubated for 24 hours at 37° C. The incubated mixture was treated as described in Example 1 whereby 29.2 g. of L-alanine crystals were obtained.

$[\alpha]_D^{25} = +14.2°$ (c.=4, in 6 N HCl)

What is claimed is:
1. A process for producing L-alanine which comprises fermenting a microorganism of *Pseudomonas dacunhae* or *Achromobacter pestifer* in an aqueous nutrient medium containing a dibasic organic carboxylic acid or its salt as a main carbon source and other suitable nutrients, incubating L-aspartic acid with the resulting fermentative broth or its refined aqueous preparation, and recovering L-alanine from the reaction mixture.

2. A process as described in claim 1, wherein said refined aqueous preparation is an aqueous suspension of living cells collected from the broth, an aqueous suspension of dried living cells or cell-free extract containing L-aspartic-β-decarboxylase prepared from the living cells.

3. A process for producing L-alanine which comprises fermenting a microorganism of *Pseudomonas dacunhae* or *Achromobacter pestifer* in an aqueous nutrient medium containing 0.5 to 2% of a dibasic organic carboxylic acid or its ammonium salt as main carbon source, 1 to 3% of nitrogen source and a small amount of mineral salts at 25 to 30° C. for one day, adding L-aspartic acid to the resulting fermentative broth and incubating at 30 to 40° C. for two to four days, filtering the reaction mixture, treating the filtrate with a strong cation exchange resin, concentrating the treated solution, and recovering said L-alanine.

4. A process as described in claim 3, wherein an appropriate surface-active agent is added to the reaction mixture containing broth and aspartic acid, which was highly effective in shortening the time required for the conversion of L-aspartic acid to L-alanine.

References Cited

FOREIGN PATENTS

| | | |
|---|---|---|
| 37–3543 | 6/1962 | Japan. |
| 37–3544 | 6/1962 | Japan. |
| 38–26945 | 12/1963 | Japan. |

LIONEL M. SHAPIRO, Primary Examiner

U.S. Cl. X.R.

195—30